United States Patent [19]
Iriko et al.

[11] 3,923,943
[45] Dec. 2, 1975

[54] METHOD FOR MOLDING SYNTHETIC RESIN HOLLOW ARTICLES

[75] Inventors: Fumio Iriko, Tokyo; Yoshihiko Yuzawa, Yokohama; Setsuyuki Takeuchi; Nobukuni Ibe, both of Sakaki, all of Japan

[73] Assignees: Nissei Plastics Industrial Co., Ltd.; Showa Denko Kabushiki Kaisha, both of Tokyo, Japan

[22] Filed: July 31, 1973

[21] Appl. No.: 384,372

[30] Foreign Application Priority Data
Aug. 9, 1972 Japan................................ 47-79088

[52] U.S. Cl............... 264/97; 264/289; 264/290 R; 425/DIG. 216
[51] Int. Cl.²......................................... B29C 17/07
[58] Field of Search ....... 264/89, 90, 92, 94, 96–99, 264/95, 289, 290 R; 425/DIG. 216

[56] References Cited
UNITED STATES PATENTS
2,952,867   9/1960   Diedrich et al...................... 264/98
3,390,426   7/1968   Turner et al................... 264/99 UX
3,412,188   11/1968  Seefluth............................ 264/97 X
3,470,282   9/1969   Scalora................................ 264/97

*Primary Examiner*—Jan H. Silbaugh
*Attorney, Agent, or Firm*—Ostrolenk, Faber, Gerb & Soffen

[57] ABSTRACT

This invention is concerned with a novel method for producing biaxially oriented hollow articles from a synthetic resin by blow molding of said resin at a temperature below the melting point of said resin which is characterized in that a parison of said resin is molded in a conventional manner, and that said parison is stretched in axial direction to a degree in which there exist in mixture oriented molecules and non-oriented molecules in said stretched direction, followed by a further stretching of said stretched parison with a pressurized gas.

6 Claims, 5 Drawing Figures

METHOD FOR MOLDING SYNTHETIC RESIN HOLLOW ARTICLES

The invention relates to a novel and superior method for producing hollow articles with good transparency and strength from a synthetic resin such as polypropylene by biaxial orientation of a parison of the synthetic resin with the use of a mechanical means and pressurized gas.

It is known well that when a crystalline synthetic resin is stretched at a temperature below its melting point in a direction, a molecular orientation occurs and strength increases. In particular, a synthetic resin such as polypropylene is not only its mechanical strength but also its transparency by biaxial stretching. Thus, many attempts have been made heretofore to mold a hollow article such as a bottle or container with good transparency and strength by biaxial stretching of parisons. But in method of stretching a parison in the lateral direction after the longitudinal stretching, the transparency and strength of the parison are reduced due to numerous cracks resulting from the stretching in lateral direction, even if a good transparency may be obtained in longitudinal stretching. Accordingly, desirable articles are not obtained.

As a means to remove such a disadvantage, biaxial stretching with only a pressurized gas may be considered. However, since a parison has some thickness different from a thin film, it is very difficult to inflate the whole parison uniformly. As a result, most of the parisons tend to be inflated partially and satisfactory hollow articles are not produced.

The inventors have made an earnest study for a molding method which overcomes these disadvantages. As the result, there has been found a novel and fine molding method whereby an easy blowing of a pressurized gas into a parison can be attained with little damage to the parison to produce hollow molded articles with high transparency and strength.

In the novel biaxial stretching method for producing hollow articles, there is no need to axially elongate the parison to the utmost. The elongation is carried out within a range in which there remain axially non-oriented and oriented molecules in mixture, and the whole parison in evenly stretched by changing the mechanical stretching to the one with a pressurized gas in the process of stretching in axial direction. In this novel molding method, the orientation can be performed at a temperature below that giving rise to a yield point or at a higher temperature without the occurrence of a yield point, because a yield point of a synthetic resin generally depends upon tensile stress and elongation.

Additionally, the stretching in axial direction by a mechanical means according to the method of this invention supports the stretching of a whole parison with a pressurized gas, and the stretching at a temperature affording a yield point is performed by the mechanical means until the lower limit of the yield point is reached, followed by the complete stretching of the parison with resultant force of the mechanical means and pressurized gas. The pressurized gas may be introduced before or at the same time the yield point is reached.

The objects and advantages of this invention will be apparent from consideration of the following detailed description of preferred embodiments thereof, taken in connection with the drawings in which.

Figure 1:
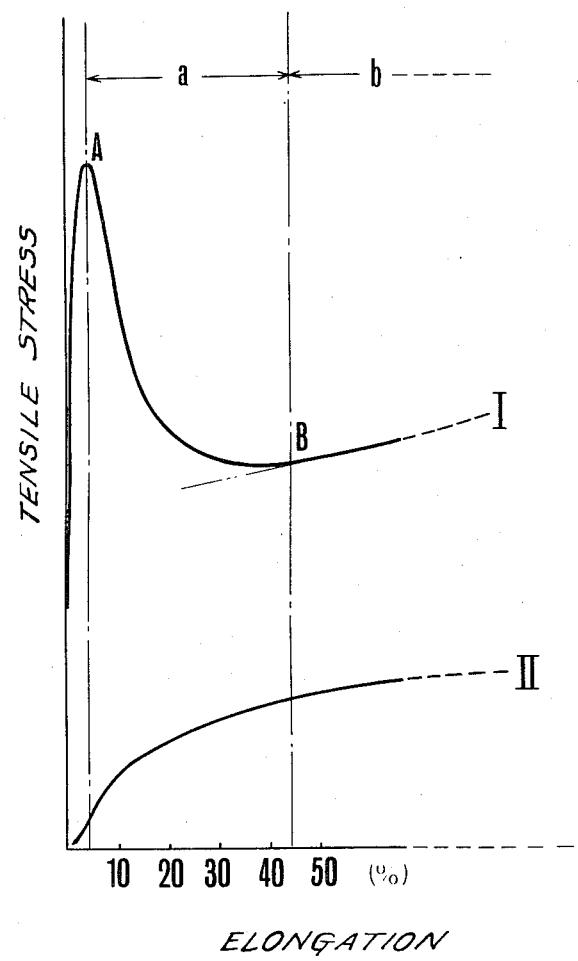
FIG. 1 is a diagram of a stress-strain curve of a thermoplastic synthetic resin such as polypropylene, wherein I represents a strain curve at a temperature producing a yield point, II represents a strain curve at a temperature without occurrence of a yield point.

As is seen from FIG. 1, the tensile stress of a synthetic resin, for example, of polypropylene, is increased in proportion to elongation in the beginning, and at a lower temperature there arises yield point A as shown in curve I. After passing point A, there is a contraction, the so-called "necking," of the material, and thereafter the material itself continues to elongate without increase of tensile stress. Yield lower limit B in curve I means a point at which a down curve-*a* from yield point A turns up to a gently-sloping stretching curve-*b*. It seems that the molecular orientation in the stretching starts at yield point A to be completed at yield lower limit B and that therefore there exists, in mixture, orientation molecules and non-orientated ones between points A and B.

On the other hand, when the temperature at stretching is very high, no yield point can be observed, and curve II shows a gentle slope without yield point. The portions in elastic area and plastic area of the curve become continuous, and no necking occurs. It is deemed that this means that molecules are hardly oriented on stretching and most of the molecules remain non-oriented.

As is described above, in the method according to this invention, the stretching in axial direction of a parison is performed to a degree wherein there exist non-oriented molecules, and the operation is transferred to blow molding of a parison mainly with a pressurized gas to mold biaxially stretched hollow articles. The details of preferred embodiments will be described hereinunder, in connection with FIG. 2 to FIG. 5.

Figure 2:
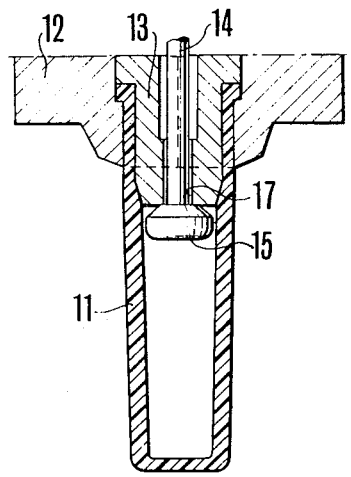
FIG. 2 shows a vertical sectional view of a parison with a holding mold.
Figure 3:
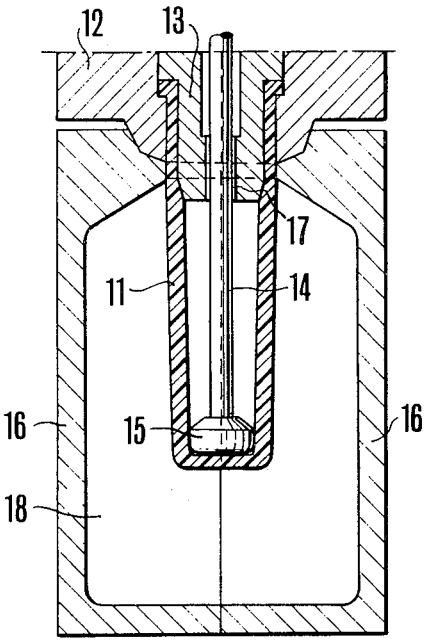
FIG. 3 is a vertical sectional view when a parison in a blowing mold is stretched in axial direction.
Figure 4:
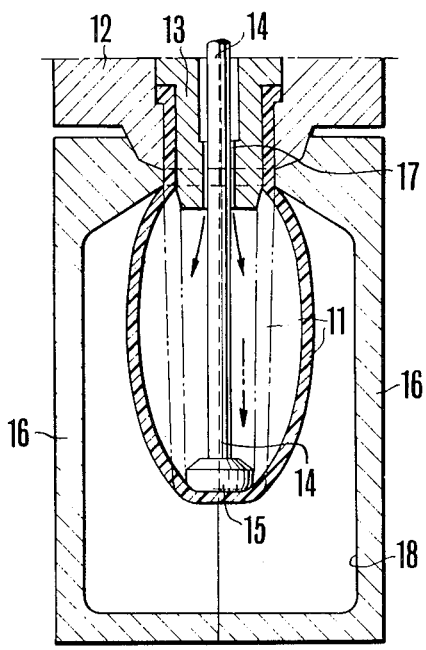
FIG. 4 is a vertical section when a pressurized gas is blown into a parison subsequent to the stretching in axial direction.
Figure 5:
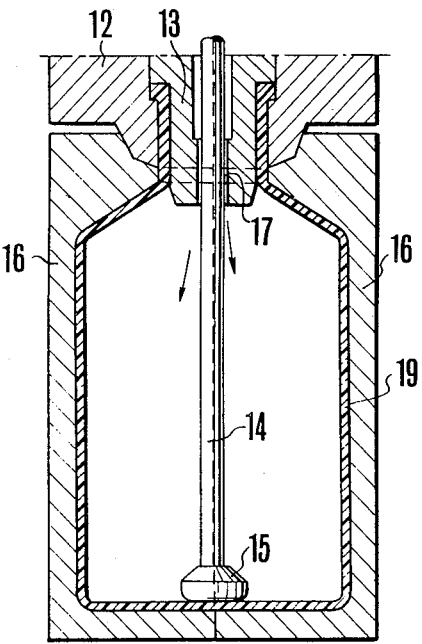
FIG. 5 represents a vertical section when molding of a hollow article is completed by blowing a pressurized gas.

In FIG. 2, numeral 11 indicates an injection molded parison, and numeral 12, a separable supporting mold to support the parison. Since parison 11 is cooled to a temperature at which it is not deformed after removing from the mold, it is necessary to reheat to a prescribed temperature in order to stretch the parison in biaxial direction. In this case, the opening part of parison 11 is held airtightly with supporting mold 12 and blow core 13 is inserted therein, and the parison is heated to a stretching temperature by a suitable means, at both the inside and outside or any one side. After completion of heating, parison 11 is moved to a separable blow mold 16 to be inserted into a cavity, and subsequently is stretched axially with stretching rod 14 having an enlarged head as is shown in FIG. 3. Subsequent to the stretching, air is blown in through gap 17 between blow core 13 and stretching rod 14 to perform blow molding to the full extent of cavity 18 of blow mold 16 by inflating the stretched parison 11. A hollow article 19 is obtained in this way, as is shown in FIG. 5. In this method of blow molding when it is carried out at a temperature giving rise to a yield point, the stretching in axial direction with the rod 14 is restricted to the degree sufficient to bring about a component force thereby to enable the successive blowing of the whole parison with a pressurized gas, and non-oriented molecules remain in some degree. Then, immediately after stretching of parison 11 to desired size with stretching rod 14, a pressurized gas is blown in order to inflate the parison to the full extent of cavity 18 while moving the rod 14 to the bottom of the cavity thereby to prevent the decentering of parison 11.

In contrast with this, when parison 11 is first stretched to the bottom of the cavity and then is blown with pressure gas to complete biaxial stretching in accordance with a conventional method, a large number of fine cracks are formed in longitudinal direction of the parison, although a considerable transparency and strength are attained. The crack greatly tends to be formed when the stretching temperature of parison 11 is low or when the stretching is performed in an elongation percentage above a desirable value for orientation, and as a result, the transparency of the product is remarkably reduced owing to diffused reflection taking place in the cracked portion.

The inventors have performed an experiment to exemplify the method according to this invention as follows:

A parison ( 70 mm high, 50 mm stretched, 20 mm of diameter and 3.0 mm thick) was prepared by injection molding of a polypropylene (MFI, 1; Sp.Gr., 0.90–0.91 g/cm³; M.P.,ca. 150°; Shoaromer EG 110, made by, Showa Yuka k.k.). The parison was stretched axially at a temperature of 132°C. as described above, and immediately after, air was blown therein with a pressure of 2.0 Kg/cm² to form a hollow container with a height of 80 mm, diameter of 50 mm, thickness of 0.38 mm and capacity of 150 cc.

The experimental results are shown below. In this case, a stress-strain curve closely resembling curve I in FIG. 1 was obtained.

| Experiment No. | Elongation (%) | Haze (%) |
|---|---|---|
| 1 | 10 | 3.6 |
| 2 | 20 | 8.6 |
| *3 | 30 | 17.3 |
| *4 | 40 | 21.0 |
| *5 | 50 | 28.7 |

*3 slight minute cracks
*4 minute cracks
*5 a large number of cracks, opaque, unsuitable as articles From the results above, it will be seen that a smaller elongation stretching in axial direction with a stretching rod is superior to a larger one, and that the stretching is preferably performed to a degree to impart axially a component force sufficient to enable the stretching with a pressure gas to start.

When parison 11 is axially stretched at a temperature below the melting point of the raw material resin and in a temperature range without a yield point, only controlled heating of the parison to a prescribed temperature is satisfactory, and there is no need of restricting the elongation percentage, as in the case of stretching at a temperature below that causing a yield point to occur. But in a whole stretching with a pressurized gas, it is necessary to stretch a parison, which was elongated axially, in a temperature range in which a yield point takes place. As a matter of fact, however, the temperature causing a yield point to occur a synthetic resin is different in before and after the stretching in axial direction because the resin has been already oriented in one direction. The temperature giving rise to a yield point in a synthetic resin, in general, tends to be higher in the oriented resin than that in the non-oriented resin, so the object of this invention can be attained by stretching parison 11 with a pressurized gas immediately after the stretching in axial direction, if the heating temperature of parison 11 is not so high.

This will be explained more in detail by the following Example and results of Comparative Example.

EXAMPLE

Bottles having shapes and sizes shown in FIGS. 2 to 5 were stretched and molded at various temperatures from a polypropylene (Showaromer G-210 made by Nippon Olefin Chemicals Co.) according to the method described above to examine their transparency. As is seen from Table 1 and the summary of results of Comparative Example, the temperature of the stretching is varied and the hazes of both in the uniaxial and biaxial stretching (test samples stretched uniaxially were further stretched in lateral direction) were determined at respective temperatures. The yield points in the column of uniaxial stretching are those of test samples stretched in the axial direction of parisons. The yield points in the column of biaxial stretching are determined as follows:

The test parison was first stretched to an elongation three times as large as the original parison, and the stretched test parison was further pulled in transverse direction at various temperatures suitably controlled and at a rate of 100 mm/min by applying it to Strograph Type 1. Thus, whether a yield point existed was observed by drawing a diagram showing the relationship between elongation and tensile stress.

Table 1

| Uniaxial Stretching | | | Test Sample No.*(3) | Biaxial Stretching | | |
|---|---|---|---|---|---|---|
| Temp. (°C.) | Presence of Yield Point | Haze %*(1) | | Temp. (°C.) | Presence of Yield Point | Haze %*(2) |
| 155 | No | 23.7 | 4 | 155 | Yes | 8.1 |
| 155 | No | 23.7 | 4 | 140 | Yes | 7.5 |

Results of Comparative Example

| Uniaxial Stretching | | | Test Sample No.*(3) | Biaxial Stretching | | |
|---|---|---|---|---|---|---|
| Temp. (°C.) | Presence of Yield Point | Haze %*(1) | | Temp. (°C.) | Presence of Yield Point | Haze %*(2) |
| 130 | Yes | 13.6 | 1 | 130 | Yes | Cloudy in*(4) White |
| 140 | Yes | 14.2 | 2 | 130 | Yes | Cloudy in White |
| 140 | Yes | 14.2 | 2 | 140 | Yes | 27.2 |

Table 1-continued

| Uniaxial Stretching | | | Test Sample No.*(3) | Biaxial Stretching | | |
|---|---|---|---|---|---|---|
| Temp. (°C.) | Presence of Yield Point | Haze %*(1) | | Temp. (°C.) | Presence of Yield Point | Haze %*(2) |
| 140 | Yes | 14.2 | 2 | 155 | Yes | 6.7 |
| 140 | Yes | 14.2 | 2 | 160 | No | 29.4 |
| 150 | Vague | 16.4 | 3 | 150 | Yes | 15.1 |
| 160 | No | 27.4 | 5 | 160 | No | 34.6 |

*(1) Determined values are converted into those of samples having an average thickness of 1.10 mm
*(2) Values are converted into those of samples having 0.35 mm average thickness
*(3) Samples are stretched uniaxially at the temperature in column 1 and are stretched biaxially at the temperature in column 5
*(4) This may result from cracks.

For reference, a test sample made from the same synthetic resin was pressed to 1.0 mm in thickness to determine its haze, and the haze was 73 %.

From the above, it will be seen that:

1. When a sample stretched uniaxially is further elongated in transverse direction, the temperature revealing a yield point is increased, compared with that of a sample without any stretching.
2. When a sample is uniaxially stretched at a temperature having a yield point, the transparency of the sample is slightly heightened, but when the stretched sample is further stretched biaxially, the transparency is reduced. In order to improve the transparency in the biaxially stretching, the stretching should be carried out at a higher temperature than that of the uniaxial stretching.
3. The transparency is decreased if both of the stretchings are performed at a temperature without a yield point.
4. When the uniaxial stretching is performed at a temperature without a yield point and subsequently the biaxial orientation is conducted at a temperature revealing a yield point, the transparency is improved with ease.

This invention has been completed on the basis of the knowledge from the experiment and Examples disclosed above. But it is to be understood that this invention should not be limited to the molding method shown in the experiment and Examples, and that it will be applicable to films and other molded articles so far as it is in the scope and spirit of this invention.

Further, according to the experimental results, when a sample stretched uniaxially is oriented in lateral direction, the yielding temperature is raised. Accordingly, it is unnecessary to heat or cool in order to cause a yield point to occur in the biaxial stretching, if the uniaxial stretching is performed at a temperature not higher than that revealing a yield point.

What is claimed is:

1. A molding method for producing a biaxially oriented hollow article from a parison made of a thermoplastic synthetic resin by blowing at a temperature below the melting point of said synthetic resin, which is characterized in mechanically stretching the parison in an axial direction and initiating blow-molding with a pressurized gas during the course of mechanical stretching and before the completion of the axial unidirectional orientation wherein the mechanical stretching is effected at a temperature below said melting point at which the synthetic resin exhibits a yield point and a yield limit, said blow molding is initiated when the parison has been stretched to a length between the yield point and yield limit, and wherein said blow-molding is effected at a higher temperature than the mechanical stretching, whereby an article of improved transparency is obtained.

2. The molding method of claim 1 wherein said resin is polypropylene.

3. The molding method of claim 2 wherein said pressurized gas is air.

4. A molding method for producing a biaxially oriented hollow article from a parison made of a thermoplastic synthetic resin by blowing at a temperature below the melting point of said synthetic resin, which is characterized in mechanically stretching the parison in an axial direction and initiating blow-molding with a pressurized gas during the course of mechanical stretching and before the completion of the axial unidirectional orientation wherein said mechanical stretching is effected at a temperature below said melting point which does not exhibit a yield point, the blow-molding is effected at a temperature exhibiting a yield point and yield limit, and wherein said blow-molding is initiated when the parison has been stretched to a length which would be between said yield point and yield limit at said temperature exhibiting a yield point and yield limit, whereby an article of improved transparency is obtained.

5. The molding method of claim 4 wherein said resin is polypropylene.

6. The molding method of claim 5 wherein said gas is air.

* * * * *